US010348934B2

(12) United States Patent
Seko

(10) Patent No.: US 10,348,934 B2
(45) Date of Patent: Jul. 9, 2019

(54) COLOR SYSTEM CONVERSION TABLE GENERATION METHOD, COLOR SYSTEM CONVERSION TABLE GENERATION APPARATUS, AND NON-TRANSITORY COMPUTER READABLE MEDIUM FOR CONVERTING COORDINATE VALUE BETWEEN DEVICE DEPENDENT COLOR SPACE AND DEVICE INDEPENDENT COLOR SPACE

(71) Applicant: SEIKO EPSON CORPORATION, Tokyo (JP)

(72) Inventor: Masayuki Seko, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/816,108

(22) Filed: Nov. 17, 2017

(65) Prior Publication Data

US 2018/0152603 A1 May 31, 2018

(30) Foreign Application Priority Data

Nov. 30, 2016 (JP) .................................. 2016-232621

(51) Int. Cl.
*H04N 1/60* (2006.01)
*H04N 1/64* (2006.01)

(52) U.S. Cl.
CPC ......... *H04N 1/6019* (2013.01); *H04N 1/6008* (2013.01); *H04N 1/6025* (2013.01);
(Continued)

(58) Field of Classification Search
CPC ........... H04N 1/00015; H04N 1/00023; H04N 1/0031; H04N 1/00034; H04N 1/00045; H04N 1/00068; H04N 1/00082; H04N 1/00087; H04N 1/60; H04N 1/6002; H04N 1/6005; H04N 1/6008; H04N 1/6016; H04N 1/6019; H04N 1/6022; H04N 1/6025; H04N 1/603; H04N 1/6033; H04N 1/6058; H04N 1/6061; H04N 1/6097; G06K 15/027; G06K 15/1878

See application file for complete search history.

(56) References Cited

U.S. PATENT DOCUMENTS

| 6,160,635 A * | 12/2000 | Usami .................. H04N 1/6019 |
| | | 358/1.9 |
| 7,196,823 B2 * | 3/2007 | Hagai .................. H04N 1/6025 |
| | | 345/601 |

(Continued)

FOREIGN PATENT DOCUMENTS

| JP | 03-158071 A | 7/1991 |
| JP | 10-028227 A | 1/1998 |

(Continued)

*Primary Examiner* — Scott A Rogers

(57) ABSTRACT

A method for generating a color system conversion table includes generating a third color system conversion table in which a color specification value of a CMY color system including three primary colors of pigment is an input and a color specification value of the device independent color space is an output, wherein the number of input lattice points of the third color system conversion table is determined such that the number of input lattice points of the third color system conversion table decreases as the gamut size of the printer decreases.

6 Claims, 9 Drawing Sheets

(52) U.S. Cl.
CPC ......... *H04N 1/6033* (2013.01); *H04N 1/6058* (2013.01); *H04N 1/6097* (2013.01); *H04N 1/646* (2013.01); *H04N 2201/0082* (2013.01)

(56) References Cited

U.S. PATENT DOCUMENTS

| | | | | |
|---|---|---|---|---|
| 7,263,218 | B2* | 8/2007 | Altenhof-Long | H04N 1/60 358/1.9 |
| 7,706,036 | B2* | 4/2010 | Yoshida | H04N 1/6019 358/1.9 |
| 7,787,149 | B2* | 8/2010 | Ichitani | G06T 11/001 358/1.9 |
| 8,625,160 | B2* | 1/2014 | Hoshino | G06K 15/1878 345/427 |
| 2006/0001892 | A1* | 1/2006 | Bai | G06T 11/001 358/1.9 |
| 2010/0284030 | A1* | 11/2010 | Yoshida | G06T 11/001 358/1.9 |
| 2018/0160015 | A1* | 6/2018 | Ito | H04N 1/6005 |

FOREIGN PATENT DOCUMENTS

| | | | |
|---|---|---|---|
| JP | 2898030 | B2 | 5/1999 |
| JP | 2003-281514 | A | 10/2003 |
| JP | 2011-254224 | A | 12/2011 |
| JP | 5440396 | B2 | 3/2014 |

* cited by examiner

| MEDIUM TYPE | AVERAGE Gamut SIZE | GROUP |
|---|---|---|
| FILM | 778,368 | GROUP 1 |
| ADHESIVE VINYL CHLORIDE | 663,145 | |
| TARPAULIN | 527,559 | GROUP 2 |
| CANVAS | 480,796 | |
| SYNTHETIC PAPER | 410,474 | |
| CLOTH | 310,264 | GROUP 3 |

COLOR SYSTEM CONVERSION TABLE GENERATION METHOD, COLOR SYSTEM CONVERSION TABLE GENERATION APPARATUS, AND NON-TRANSITORY COMPUTER READABLE MEDIUM FOR CONVERTING COORDINATE VALUE BETWEEN DEVICE DEPENDENT COLOR SPACE AND DEVICE INDEPENDENT COLOR SPACE

BACKGROUND

1. Technical Field

A technique disclosed in the present specification is a technique relating to a printer, and specifically to a method for generating a color system conversion table for converting a coordinate value between a device dependent color space and a device independent color space.

2. Related Art

In order to obtain an appropriate printed material in accordance with the characteristic of individual printers, the characteristic of a print medium, the color development characteristic of ink, and the like, a A2B table (a table for conversion from a device dependent color space to a device independent color space) and a B2A table (a table for conversion from the device independent color space to the device dependent color space) are used. For example, when the B2A table is a Lab-CMYK table, an input color system is three dimensional, and an output color system is four dimensional, and therefore, an output value with respect to an input value is not uniquely determined. Thus, a technique for determining an output value (CMYK value) with respect to an input value (Lab value) by using an expression for conversion from a CMY color system to a CMYK color system is proposed (see, for example, JP-A-3-158071, JP-A-2011-254224).

The conversion from the CMY color system to the CMYK color system is non-linear, and therefore, according to the technique described in JP-A-3-158071, a large number of lattice points of the CMY color system are provided to secure the color reproduction accuracy, which requires time for calculation. Moreover, according to the technique described in JP-A-2011-254224, the expression for conversion from the CMY color system to the CMYK color system is used to generate a color chart expressed by coordinate values of the CMYK color system, and a result of the colorimetry is used to generate a B2A table. In this case, since a user generates color chart data, perform printing, and measures a colorimetric value each time expression for conversion from the CMY color system to the CMYK color system is changed, man-hours and time are needed.

SUMMARY

The present specification discloses a technique for reducing generation time of a color system conversion table while a color reproduction accuracy is appropriately maintained.

An advantage of some aspects of the technique disclosed in the specification is that at least some of the above problems can be solved and the technique can be implemented as the following aspects.

(1) According to an aspect of the technique disclosed in the present specification, a method for generating a color system conversion table is provided, the method generating a first color system conversion table in which a color specification value of a device independent color space is an input and a color specification value of a CMYK color system including three primary colors of pigment and a black color is an output. This method includes generating a second color system conversion table in which the color specification value of the CMYK color system is an input and the color specification value of the device independent color space is an output, a colorimetric value of a color chart generated by a printer by using a color chart value of the CMYK color system being measured to acquire a colorimetric value of the device independent color space corresponding to the color chart value, the color chart value and the colorimetric value being used to perform interpolation to obtain the color specification value of the device independent color space as an output value, the color specification value of the device independent color space corresponding to a predetermined input value of the second color system conversion table; generating a third color system conversion table in which a color specification value of a CMY color system including three primary colors of the pigment is an input and the color specification value of the device independent color space is an output; acquiring a conversion characteristic for converting the color specification value of the CMY color system into the color specification value of the CMYK color system; obtaining an input CMY value of the CMY color system corresponding to a predetermined input value of the first color system conversion table by using the third color system conversion table; and determining a first output value as an output value of the first color system conversion table, the output value being obtained by converting the input CMY value into the color specification value of the CMYK color system by using the conversion characteristic, wherein the generating of the third color system conversion table includes: determining the number of input lattice points of the third color system conversion table such that the number of input lattice points of the third color system conversion table decreases as a gamut size of the printer decreases; determining an input lattice point of the third color system conversion table; obtaining an input CMYK value of the CMYK color system corresponding to the input lattice point of the third color system conversion table by using the conversion characteristic; and determining a third output value as an output value of the third color system conversion table by obtaining the color specification value of the device independent color space corresponding to the input CMYK value by using the second color system conversion table.

According to the method for generating a color system conversion table of the aspect, the number of input lattice points is determined such that the number of input lattice points of the third color system conversion table decreases as the gamut size of the printer decreases. The CMY value corresponding to the input lattice point of the first color system conversion table is determined by interpolation using the third color system conversion table, and as the gamut size decreases, its interpolation error decreases, and therefore, the influence over the color reproduction accuracy is small even with a small number of lattice points. The number of input lattice points which decreases as the gamut size decreases reduces a time required to generate a color system conversion table while the color reproduction accuracy is maintained appropriately, whereas, when the gamut size is large, the number of lattice points is maintained, thereby enabling maintenance of the color conversion accuracy.

(2) In the method for generating a color system conversion table, it is preferable that in the determining of the number of input lattice points in the generating of the third color system conversion table, the the number of input lattice points of the third color system conversion table is reduced as a brightness range of black ink decreases. A small brightness range of the black ink means that the gamut size of a dark area does not increase even when K ink is used (black is expressed by a color mixture of C ink, M ink, Y ink, K ink), as compared to the case where the K ink is not used (black is expressed by a color mixture of only C ink, M ink, and Y ink). Thus, even when the number of input lattice points of the third color system conversion table is reduced, a reduction in color reproduction accuracy at the time of generation of the first color system conversion table is suppressed. Thus, a reduction in color reproduction accuracy is suppressed, and additionally, a time required to generate the color system conversion table can be reduced.

(3) In the method for generating a color system conversion table, it is preferable that in the determining of the input lattice point of the generating of the third color system conversion table, the input lattice point of the third color system conversion table includes a black color generation point of the conversion characteristic. In this way, the accuracy of the third color system conversion table is improved, thereby suppressing a reduction in color reproduction accuracy.

(4) In the method for generating a color system conversion table, in the determining of the number of input lattice points of the generating of the third color system conversion table, the the number of input lattice points of the third color system conversion table may be reduced as a coordinate value corresponding to the black color generation point of the acquired conversion characteristic increases. In the color gamut having a coordinate value smaller than that of the black color generation point, the linearity of the CMY value and the color specification value (color value) of the device independent color space is high, and therefore, even when the number of input lattice points of third color system conversion table is reduced, an interpolation error in the first color system conversion table is less likely be caused. Thus, also in this way, the processing time can be reduced while maintaining the color reproduction accuracy.

(5) In the method for generating a color system conversion table, in the determining of the input lattice points of the generating of the third color system conversion table, an interval between input lattice points whose one-dimensional coordinate value is larger than the black point generated point of the conversion characteristic which has been acquired may be smaller than an interval between input lattice points in an area in which the one-dimensional coordinate value is smaller than that of the black point generated point. In the color gamut having a coordinate value larger than that of the black color generation point, the non-linearity of the CMY value and the color specification value (color value) of the device independent color space is high. Thus, in this way, color reproduction accuracy can be increased.

The technique disclosed in the present specification can also be realized as various aspects other than the method for generating a color system conversion table. The technique can be realized in various types of aspects such as a color system conversion table generation program, various types of apparatuses for performing a method for generating the color system conversion table, a system including the various types of apparatuses, a computer program for realizing the control method of the various types of apparatuses and the system, and a non-transitory storage medium in which the computer program is stored.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
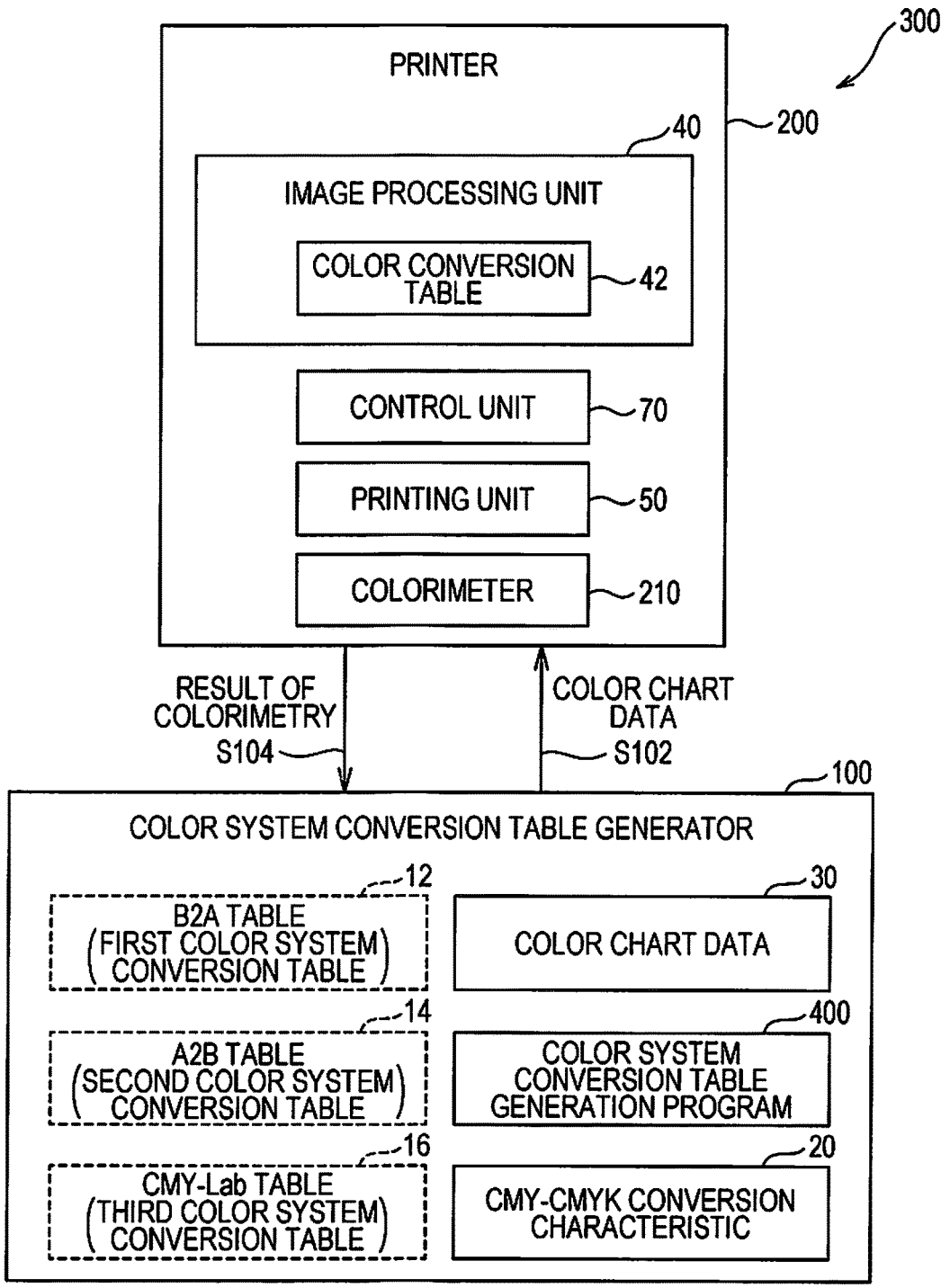
FIG. 1 is a block diagram showing a color system conversion table generation system.

FIG. 1 is a block diagram showing a color system conversion table generation system 300. The color system conversion table generation system 300 includes a color system conversion table generator 100 and a printer 200.

The printer 200 includes a printing unit 50, an image processing unit 40, a control unit 70, and a colorimeter 210. The printing unit 50 includes a plurality of ink head units (not shown), wherein an ink cartridge is attached to each ink head unit to supply ink to each ink head unit. The printer 200 is configured to be able to use four types of ink, i.e., cyan (C), magenta (M), yellow (Y), and black (K).

The image processing unit 40 includes a color conversion table 42. The color conversion table 42 is a table in which a color specification value of a device dependent color space is an input and an ink amount is an output. In the present embodiment, as the device dependent color space, a CMYK color system is described as an example. A coordinate value (color specification value) of the CMYK color system is hereinafter also referred to as a CMYK value or CMYK data. Image data is specifically described by a combination of values (0 to 255) of C (cyan), Y (yellow), M (magenta), and K (black).

The control unit 70 includes a microcomputer including a Central Processing Unit (CPU) and memory (a main memory apparatus) and is capable of controlling the components of the printer 200. Note that the printer 200 includes an external interface unit, an operation panel, a media transport unit, and the like which are not shown in FIG. 1.

A colorimeter 210 measures the colorimetric values of a printed material created by the printer 200 and a printed material created by another printing apparatus. The result of the colorimetry is represented by a color value of the device independent color space. In the present embodiment, as the device independent color space, a CIE-Lab color system is used. In the following description, the color value of the CIE-Lab color system is also simply referred to as an "L*a*b* value" or a "Lab value". As the device independent color space, another known color system such as CIE-Luv may be used.

When image data created by a computer is input to the image processing unit 40 of the printer 200, the CMYK data is converted into ink amount data by means of the color conversion table 42. The control unit 70 controls formation of a print image in the printing unit 50 on the basis of the ink amount data. As a result, a printed material is created.

The color system conversion table generator 100 is a computer including an arithmetic apparatus (CPU), a memory apparatus (ROM, RAM, HDD, memory, etc.), an input/output interface, and the like. The color system conversion table generator 100 stores a color system conversion table generation program 400, color chart data 30, and a CMY-CMYK conversion characteristic 20 in the memory apparatus. The color chart data 30 is color image data expressed by the color specification value (color chart value) of a four-dimensional device dependent color space. As the color chart data 30, for example, an ECI2002 chart may be used. Note that another standard color chart such as IT8.7/3 may be used or a color chart specifically provided by a manufacturer of the printer 200 may be used. In the present embodiment, as the four-dimensional device dependent color space, the CMYK color system including the three primary colors of pigment and the black color.

The CMY-CMYK conversion characteristic 20 is a conversion characteristic (which will be described in detail later) of converting a color specification value of the CMY color system including three primary colors of pigment into a color specification value of a CMYK color system.

The color system conversion table generator 100 executes, as described in detail later, a color system conversion table generation process in which the color system conversion table generation program 400 is executed to generate a A2B table 14 and a B2A table 12 by using the color chart data 30 and the result of the colorimetry performed by the colorimeter 210 of the printer 200. In the present embodiment, the A2B table 14 is a color system conversion table in which the CMYK value is an input and the Lab value is an output, and the B2A table 12 is a color system conversion table in which the Lab value is an input and the CMYK value is an output. Since a plurality of CMYK values expressing a color (Lab value) exist, the output value (CMYK value) corresponding to an input value (Lab value) is not uniquely determined. Thus, when in the present embodiment, the B2A table 12 is generated, a conversion characteristic (the CMY-CMYK conversion characteristic 20) from the CMY color system to the CMYK color system is used to determine an output value (CMYK value) with respect to an input value (Lab value). Thus, during the execution of the color system conversion table generation process, a CMY-Lab table 16 is generated. The CMY-Lab table 16 is a color system conversion table in which the CMY value is an input and a Lab value is an output. Note that the A2B table 14, the B2A table 12, and the CMY-Lab table 16 are generated by execution of the color system conversion table generation process and are thus illustrated by broken lines in FIG. 1. The A2B table 14 and the B2A table 12 are generated in accordance with a combination and the like of, for example, a print medium and ink types. The B2A table 12, the A2B table 14, and the CMY-Lab table 16 in the present embodiment are respectively referred to as a "first color system conversion table", a "second color system conversion table", and a "third color system conversion table". Moreover, the CMYK value, the CMY value, and the Lab value are each also referred to as a "color specification value".

Figure 2:
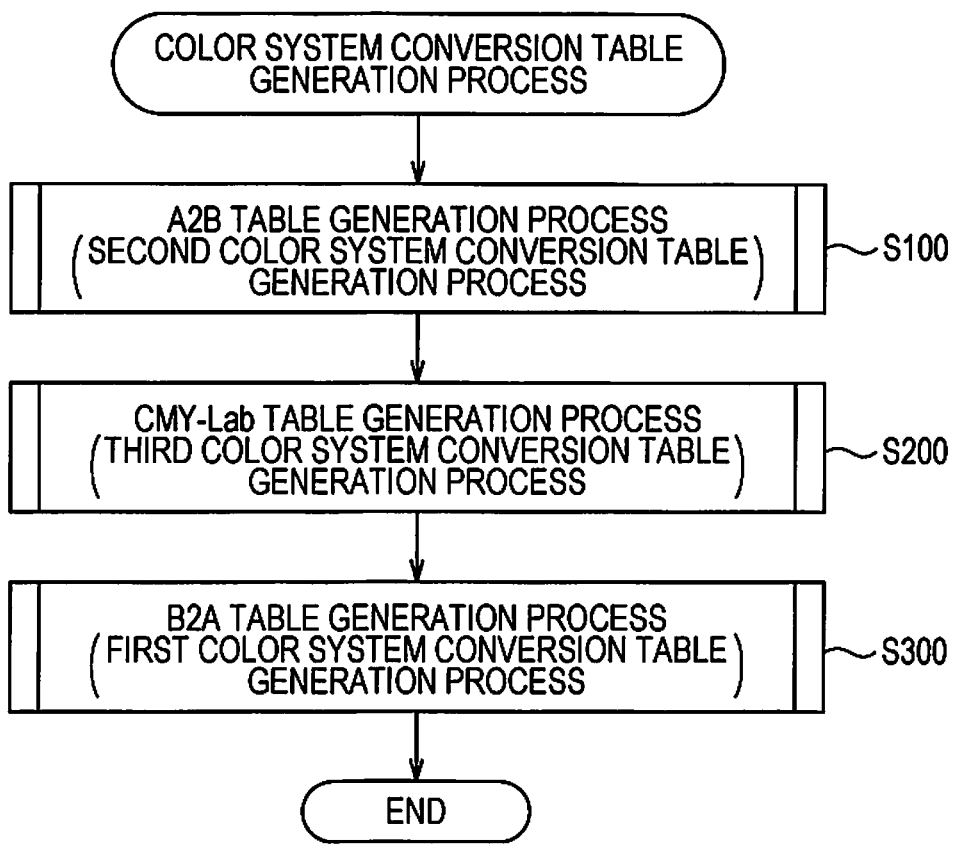
FIG. 2 is a flowchart showing a flow of a color system conversion table generation process.

FIG. 2 is a flowchart showing a flow of the color system conversion table generation process. In step S100, the A2B table 14 is generated by means of the above-described color chart data 30 and the result of the colorimetry. In step S200, the CMY-Lab table 16 is generated by means of the A2B table 14 generated in step S100 and the CMY-CMYK conversion characteristic 20. The number of input lattice points of the CMY-Lab table 16 is determined based on the gamut size of the printer 200. In step S300, the B2A table 12 is generated by means of the CMY-Lab table 16 generated in step S200 and the above-described CMY-CMYK conversion characteristic. Each step will be described in detail later.

Figure 3:
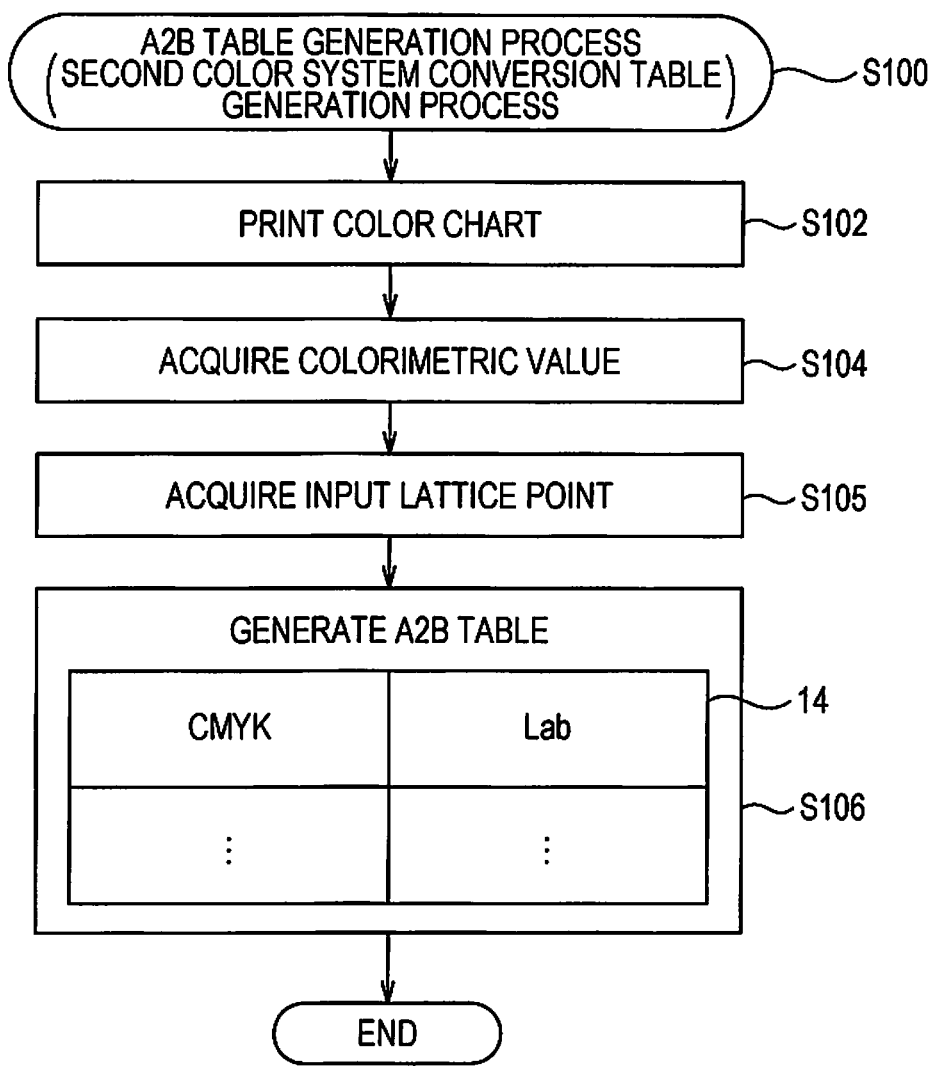
FIG. 3 is a flowchart showing a flow of an A2B table generation process.

FIG. 3 is a flowchart showing a flow of an A2B table generation process (step S100).

In step S102, the printer 200 (FIG. 1) prints a color chart. Specifically, the color system conversion table generator 100 supplies the color chart data 30 to the printer 200, and thus, the printer 200 converts the color chart data 30 by means of the color conversion table 42 to form a print image (color chart) according to the color chart data 30.

In step S104, the color system conversion table generator 100 acquires a colorimetric value (Lab value) corresponding to the color chart data 30 (CMYK value). Specifically, the printer 200 measures the color value of the color chart formed in step S102 by the colorimeter 210 included in the printer 200 and outputs the color value to the color system conversion table generator 100. Note that in FIG. 1, exchange of data between the color system conversion table generator 100 and the printer 200 is shown with step numbers.

In step S105, the color system conversion table generator 100 acquires a predetermined input lattice point (CMYK value) of the A2B table 14.

In step S106, the color system conversion table generator 100 obtains a color value (Lab value) corresponding to the input lattice point (CMYK value) acquired in step S105 by interpolation using the relationship between the color chart data 30 (CMYK value) and the corresponding colorimetric value (Lab value) to generate the A2B table 14 in which the input lattice point (CMYK value) is in an input value and the color value (Lab value) obtained by the interpolation is an output value.

Before the CMY-Lab table generation process (step S200) is explained, the CMY-CMYK conversion characteristic 20 will be described with reference to FIG. 4.

Figure 4:
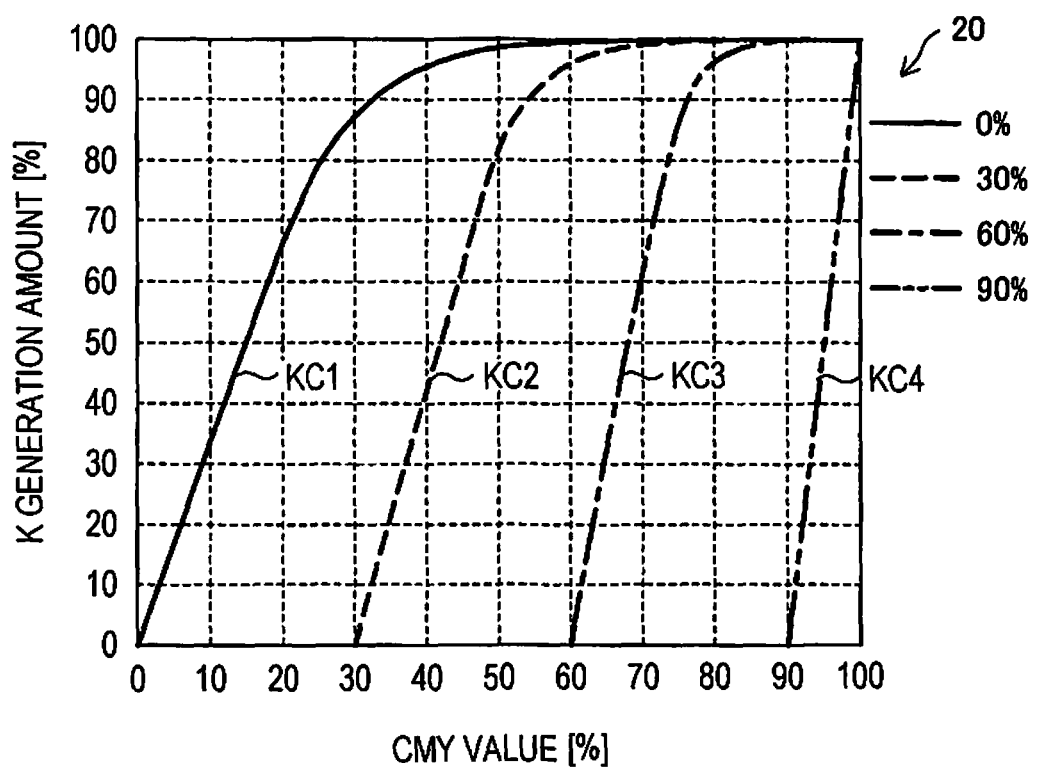
FIG. 4 is an explanatory view illustrating a CMY-CMYK conversion characteristic.

FIG. 4 is an explanatory view illustrating the CMY-CMYK conversion characteristic 20. In FIG. 4, the CMY-CMYK conversion characteristic 20 is shown, where the input axis represents the CMY value (%), and the output axis represents the K generation amount (%). As the CMY value (%), a minimum value of the C value, the M value, and the Y value included in the CMY value of the conversion target is used. In the present embodiment, each of the CMY values is a value between 0 to 255, and in FIG. 4, each of the CMY values is shown in association with 0% to 100%, where 255 of the CMY value is 100%. The color system conversion table generator 100 includes four types of K generation curves as the CMY-CMYK conversion characteristics 20. The four types of K generation curves are different from each other in K generation start position and form of the curve. At the K generation start position (CMY value), a first K generation curve KC1 corresponds to 0%, a second K generation curve KC2 corresponds to 30%, a third K generation curve KC3 corresponds to 60%, and a fourth K generation curve KC4 corresponds to 90%. The first to fourth K generation curves KC1 to KC4 are hereinafter simply referred to as K generation curves KC when not being distinguished from one another. The K generation curve KC in the present embodiment is also referred to as "conversion characteristic". In the present embodiment, the K generation start position is simply referred to as a "K generation point" or a "black color generation point".

A user selects one desired K generation curve KC from the four types of K generation curves KC. For example, when a user selects the second K generation curve KC2, K is not generated in the case of a CMY value (any of the C value, the M value, and the Y value) being less than or equal to 30%. In other words, in the case of the CMY value being less than or equal to 30%, when (C, M, Y)=(C1, M1, Y1), (C, M, Y, K)=(C1, M1, Y1, 0). In contrast, in the case of the CMY value being greater than 30%, K is generated with the characteristic shown in the figure for the CMY value. For example, when (C, M, Y)=(35, 50, 60)(%), (C, M, Y, K) (35, 50, 60, 20)(%). The K value is a value corresponding to the CMY value=35 of the second K generation curve KC2.

Figure 5:
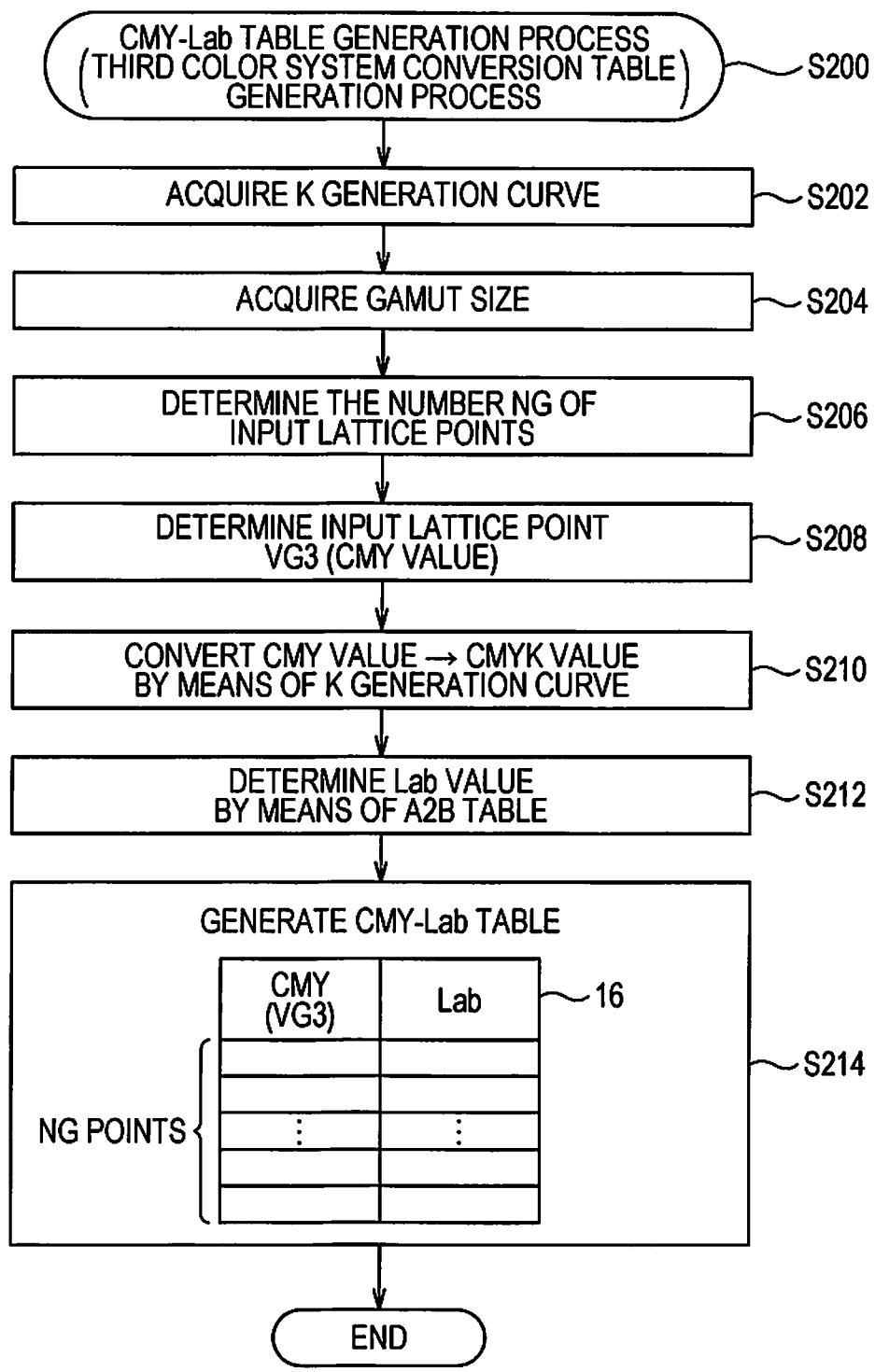
FIG. 5 is a flowchart showing a flow of a CMY-Lab table generation process.

FIG. 5 is a flowchart showing a flow of the CMY-Lab table generation process (step S200).

In step S202, the color system conversion table generator 100 acquires the K generation curve KC. Specifically, a user selects a K generation curve KC from a plurality of K generation curve KC displayed on a display unit (not shown) connected to the color system conversion table generator 100 via an operation unit (not shown), and the color system conversion table generator 100 receives the selection by the user and acquires the selected one K generation curve KC from the CMY-CMYK conversion characteristic 20.

In step S204, the color system conversion table generator 100 uses the colorimetric value acquired in the above-described step S104 (FIG. 3) to calculate a gamut size by the following Expression 1.

gamut size GS=brightness difference×range in $a$ direction×range in $b$ direction=(maximum value of $L$ value−minimum value of $L$ value)×(maximum value of $a$ value−minimum value of $a$ value)×(maximum value of $b$ value−minimum value of $b$ value) (Expression 1)

The gamut size obtained by Expression 1 is approximately calculated and does not coincide with the accurate gamut size, but the approximation method provides a good correlation with the accurate gamut size. Note that the gamut size calculation method is not limited to Expression 1 but may be accordingly modified.

In step S206, the color system conversion table generator 100 determines the number NG of input lattice points of the CMY-Lab table 16 in accordance with the gamut size GS acquired in step S204. In the present embodiment, the number NG of input lattice points is determined as described below.

When gamut size GS>2,500,000, the number NG of input lattice points=the cube of 22
When 1,000,000<gamut size GS≤2,500,000, the number NG of input lattice points=the cube of 17
When gamut size GS≤1,000,000, the number NG of input lattice points=the cube of 16

The number NG of input lattice points is experimentally predetermined. A method for determining the number NG of input lattice points will be described later.

In the present embodiment, the range of the gamut size is classified into three types, a type of less than or equal to 1,000,000, a type of greater than 1,000,000 to less than 2,500,000, and a type of greater than 2,500,000. These threshold values are determined on the basis of a standard deviation obtained from the variation of the gamut size of a plurality of medium types (types of print media) and e evaluation of the number of CMY lattice points reasonable for each gamut size (that is, experimental result). Thus, each threshold value is not limited to the value of the present embodiment but may be accordingly determined in accordance with the type of the printer and/or the medium type.

In step S208, the color system conversion table generator 100 determines an input lattice point VG3 (lattice point position) of the CMY-Lab table 16. In the present embodiment, the values 0 to 255 are substantially equally divided by the number NG of input lattice points determined in step S206 to determine the input lattice point VG3. Step S208 in the present embodiment is also referred to as an "input lattice point determination step".

In step S210, the color system conversion table generator 100 uses the K generation curve KC acquired in step S202 to convert the input lattice point VG3 (CMY value) determined in step S208 into the CMYK value.

In step S212, the color system conversion table generator 100 uses the A2B table 14 generated in step S200 to obtain a Lab value corresponding to the CMYK value obtained in step S210.

In step S214, the color system conversion table generator 100 generates the CMY-Lab table 16 in which the input lattice point VG3 (CMY value) obtained in step S208 is an input and the Lab value obtained in step S212 is an output. Step S214 in the present embodiment is also referred to as a "third output value determination step".

Figure 6:
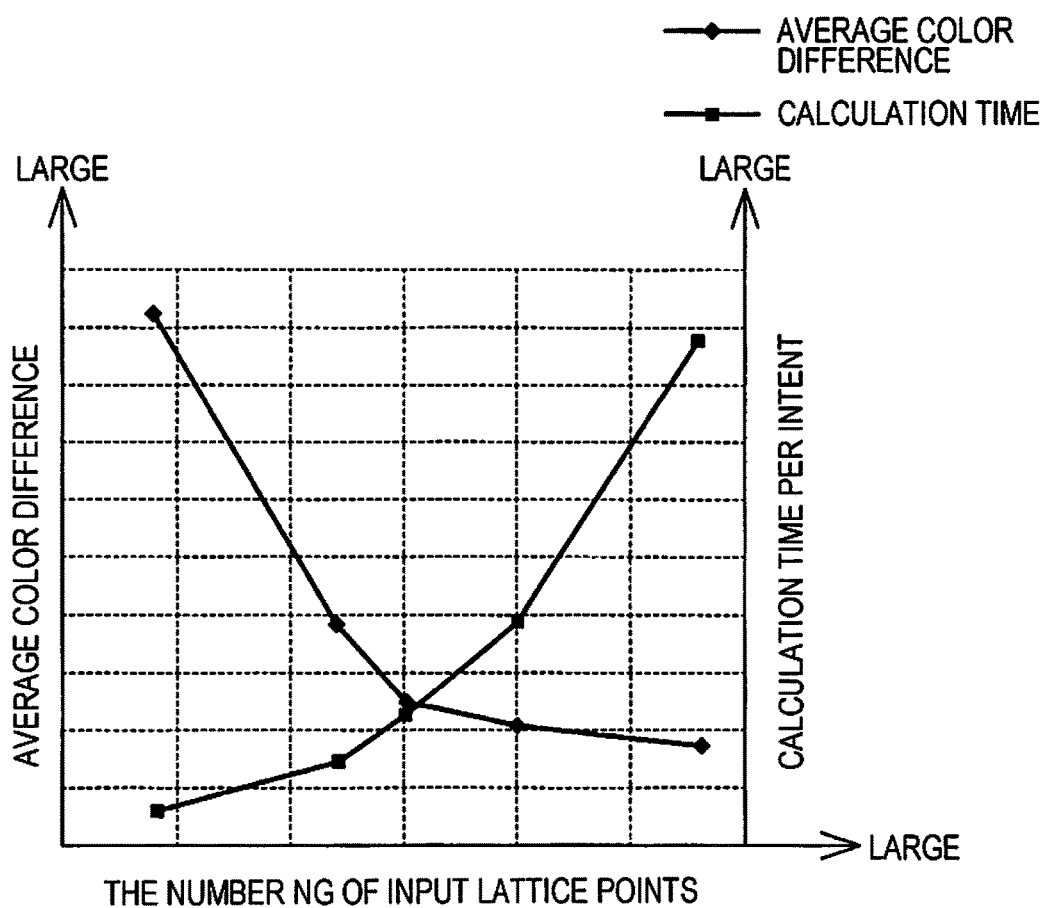
FIG. 6 is an explanatory view conceptually showing the relationship between the number of input lattice points of the CMY-Lab table and a color reproduction accuracy and a calculation time.

FIG. 6 is an explanatory view conceptually showing the relationship of the number NG of input lattice points of the CMY-Lab table 16 to the color reproduction accuracy and the calculation time. In FIG. 6, the number NG of input lattice points of the CMY-Lab table 16 is shown on the abscissa, and an average color difference and a calculation time per 1 intent is shown on the ordinate. Here, the average color difference is an average color difference between an output value (Lab value) with respect to an input value (CMY value) of the A2B table 14 and a result of the colorimetry (Lab value) obtained by measuring the colorimetric value of a printed material based on the CMYK value obtained by using the B2A table 12, and is an index of color reproduction accuracy. The number NG of input lattice points of the CMY-Lab table 16 is changed to generate the B2A table 12 for each of the number NG of input lattice points of the CMY-Lab table 16, and the B2A table 12 according to the number NG of input lattice points of the CMY-Lab table 16 is used to generate the graph shown in FIG. 6 on the basis of the print result printed by generating print data. The average color difference decreases as the number NG of input lattice points increases. That is, it can be said that the larger the number NG of input lattice points is, the higher the color reproduction accuracy. In contrast, the calculation time per 1 intent increases as the number NG of input lattice points increases. Using the graph enables the number of input lattice points to be determined in consideration of the balance of the color reproduction accuracy and the calculation time. For example, to enable the compatibility of the color reproduction accuracy and the calculation time, the number NG of input lattice points at the intersection point of the two curved lines may be used. Note that the relationship between the number NG of input lattice points and the average color difference and the relationship between the the number NG of input lattice points and the calculation time tend to be different for each gamut size, and therefore, the graph shown in FIG. 6 is created for each gamut size to determine an appropriate number NG of input lattice points. Note that the gamut size may be roughly divided into groups depending on the types of print media to create the graph shown in FIG. 6 for each group.

Figure 7:
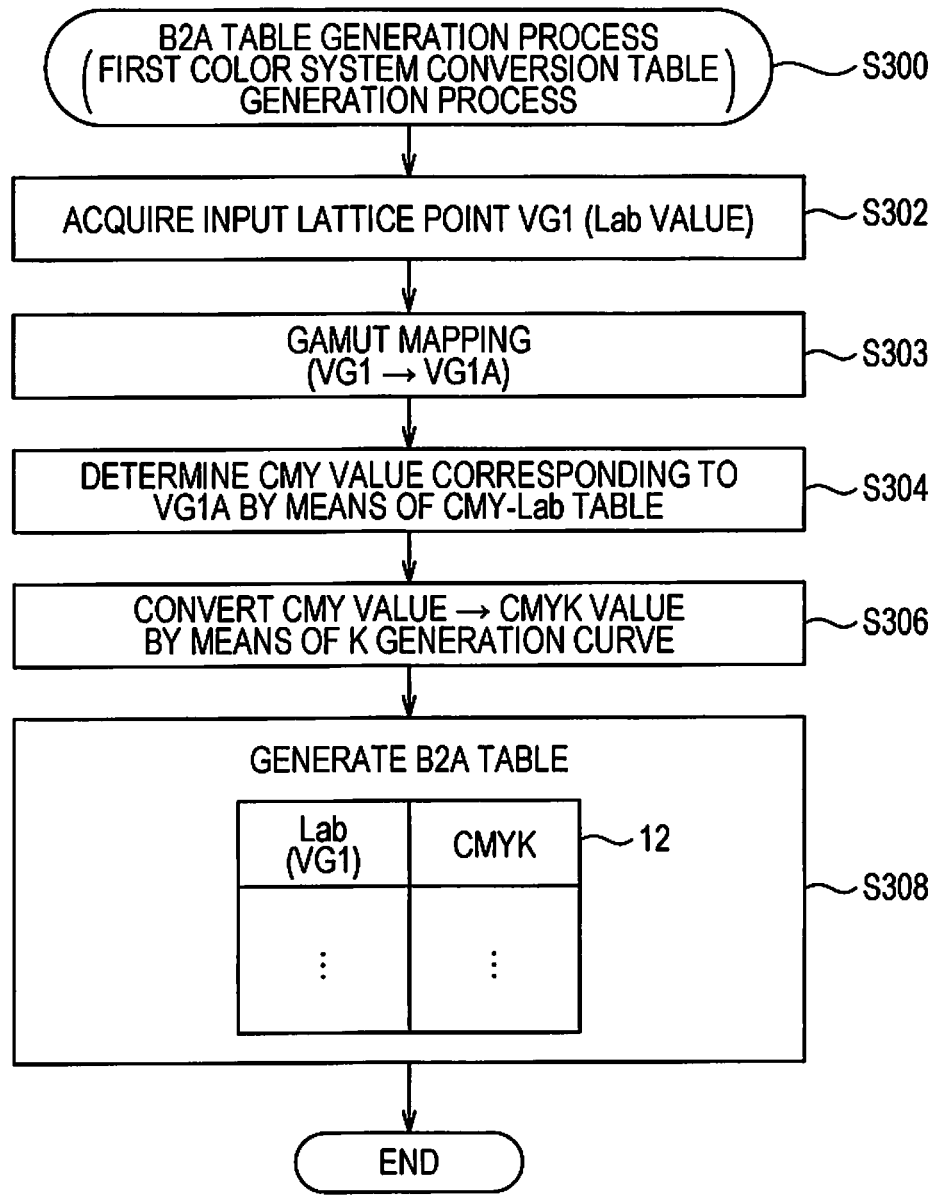
FIG. 7 is a flowchart showing a flow of a B2A table generation process.

FIG. 7 is a flowchart showing a flow of a B2A table generation process (step S300).

In step S302, the color system conversion table generator 100 acquires a predetermined input lattice point VG1 (Lab value). The input lattice point of the B2A table 12 is stored as a parameter file (not shown) in the memory unit of the color system conversion table generator 100.

In step S303, the color system conversion table generator 100 performs gamut mapping on the input lattice point VG1 acquired in step S302 to obtain a corresponding input lattice point VG1A. As a mapping parameter of the gamut mapping, any of Perceptual, Colorimetric, and Saturation may be used.

In step S304, the color system conversion table generator 100 determines a CMY value corresponding to the corresponding input lattice point VG1A (Lab value) acquired in step S303 by inverse conversion by means of the CMY-Lab table 16 generated in step S200 (FIG. 5) described above.

In step S306, the color system conversion table generator 100 uses the K generation curve KC acquired in the above-described step S202 (FIG. 5) to convert the CMY value determined in step S304 into a CMYK value.

In step S308, the color system conversion table generator 100 generates the B2A table 12 in which the input lattice point VG1 (Lab value) acquired in step S302 is an input, and the CMYK value obtained in step S306 is an output. Step S308 in the present embodiment is also referred to as a "first output value determination step".

As described above, according to the method for generating a color system conversion table of the present embodiment, the conversion characteristic (K generation curve KC) from the CMY value into the CMYK value and the colorimetric value of the color chart (printed material) are used to generate the B2A table 12 (Lab-CMYK table). Specifically, the CMY-Lab table 16 is generated by means of the colorimetric value (Lab value) of the color chart (printed material) and the conversion characteristic (K generation curve KC) from the CMY value into the CMYK value and the CMY-Lab table 16 are used to generate the B2A table 12 (Lab-CMYK table). Since the conversion characteristic from the CMY value to the CMYK value is non-linear, a sufficiently large number of input lattice points of the CMY-Lab table 16 may be set to maintain the accuracy. However, as the number of input lattice points of the CMY-Lab table 16 increases, the processing time required to generate the CMY-Lab table 16 increases. In contrast, in the method for generating a color system conversion table of the present embodiment, the the number NG of input lattice points is determined on the basis of the gamut size obtained from the result of the colorimetry of the color chart (printed material) such that the number NG of input lattice points of the CMY-Lab table 16 decreases as the gamut size decreases. Thus, the smaller the gamut size is, the more the processing time required to generate the B2A table 12 can be reduced.

Here, the influence of the gamut size on the relationship between the number NG of input lattice points of the CMY-Lab table 16 and the color reproduction accuracy will be described with reference to FIG. 8.

Figure 8:
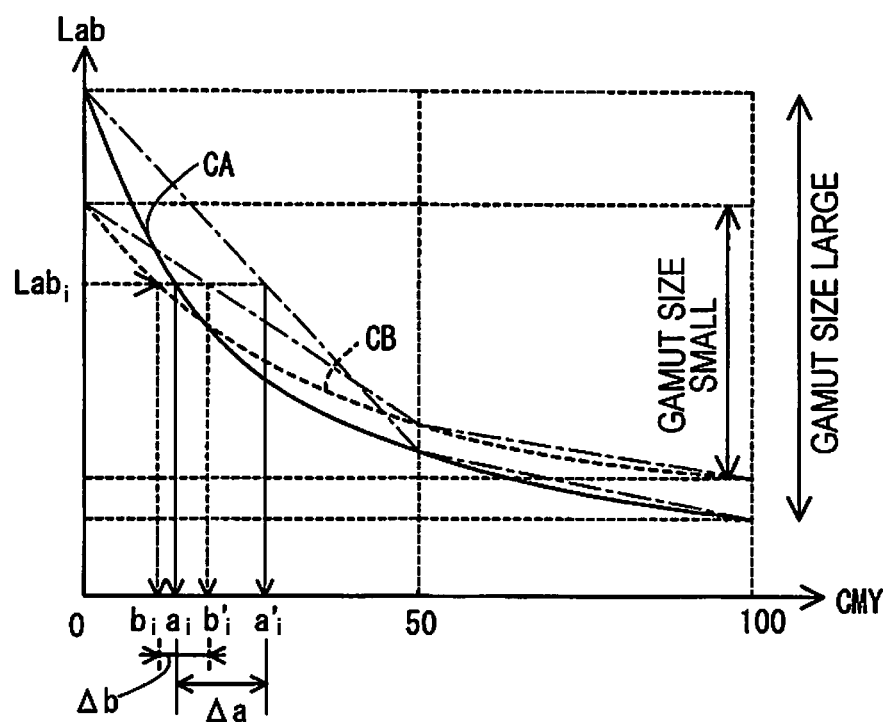
FIG. 8 is an explanatory view illustrating effects of a first embodiment.

FIG. 8 is an explanatory view illustrating effects of the present embodiment. In the figure shown in FIG. 8, the CMY value-Lab value relationship is two-dimensionally expressed, wherein the CMY value is shown on the abscissa and the Lab value is shown on the ordinate. As described above, the CMY value used in the CMY-Lab table 16 is a virtual CMY value realizing the Lab value denoted by a CMYK value, and the gamut size is not changed from the gamut size (gamut size based on the result of the colorimetry of the color chart) corresponding to the CMYK value input to the printer 200. In FIG. 8, two types of CMY-Lab characteristics (relationships) with different gamut sizes are shown, and a first characteristic CA and a second characteristic CB which is smaller in gamut size than the first characteristic CA are shown. Similarly to the present embodiment, this figure is generated by means of the colorimetric value of the color chart. Note that the gamut size varies depending on the differences of the types of print media, a combination of the print media and ink types, and the like. To simplify the description, hereinafter, the B2A table generation process will be described, where the number of input lattice points of the CMY-Lab table 16A corresponding to the first characteristic CA and the CMY-Lab table 16B corresponding to the second characteristic CB are three (0, 50, 100(%)) per dimension. Linear interpolation is performed between the lattice points of the CMY-Lab table 16 for modification in a step (FIG. 7: step S304) of determining a CMY value corresponding to the input lattice point of the B2A table 12. In this case, for the input lattice point VG1A=Labi of the B2A table 12, the CMY value is obtained by interpolation by means of the CMY-Lab table 16A, thereby obtaining CMY value=ai', and the CMY value corresponding to the colorimetric value Labi is CMY value ai. Similarly, for the input lattice point VG1A=Labi of the B2A table 12, the CMY value is obtained by interpolation by means of the CMY-Lab table 16B, thereby obtaining CMY value=bi', and the CMY value corresponding to the colorimetric value Labi is CMY value=bi. As illustrated in FIG. 8, as to an interpolation error of the CMY value, an error $\Delta b$ in the case of using the CMY-Lab table 16B is smaller than an error $\Delta a$ in the case of using the CMY-Lab table 16A. When the error in determining the CMY value by means of the CMY-Lab table 16 is large, the error of the output value (CMYK value) of the B2A table 12 is large, thereby reducing the color reproduction accuracy. That is, when the gamut size is large, a larger number of input lattice points of the CMY-Lab table 16 is determined than when the gamut size is small, thereby improving the color reproduction accuracy. In other words, when the gamut size is small, the reduction in color reproduction accuracy is not large even when a relatively small number of input lattice points of the CMY-Lab table 16 is determined. Thus, when the gamut size is small, determining a small number of input lattice points of the CMY-Lab table 16 enables the process speed to be increased while a reduction in color reproduction accuracy is suppressed.

Moreover, in the present embodiment, the gamut size GS is approximately calculated by Expression 1, and therefore, the processing time can be shorter than in the case where the gamut size is calculated in detail (accurately).

B. Second Embodiment

In a method for generating a color system conversion table of a second embodiment, when the number of input lattice points is determined in the generation step of the CMY-Lab table 16, the color development effect of K (black) ink is taken into consideration in addition to the gamut size, and as the color development effect of the K ink decreases, the number of input lattice points decreases.

A difference of the method for generating a color system conversion table of the second embodiment from the method for generating a color system conversion table of the first embodiment is the step (step S206) of determining the number of input lattice points in the CMY-Lab table generation process step S200 (FIG. 5) of the first embodiment. Thus, the step of determining the number of input lattice points of the present embodiment will be described below, and the description of the other steps will be omitted. That is, in the method for generating a color system conversion table of the second embodiment, step S206A described below is performed instead of step S206 of the method for generating a color system conversion table of the first embodiment.

Figures 9, 10:
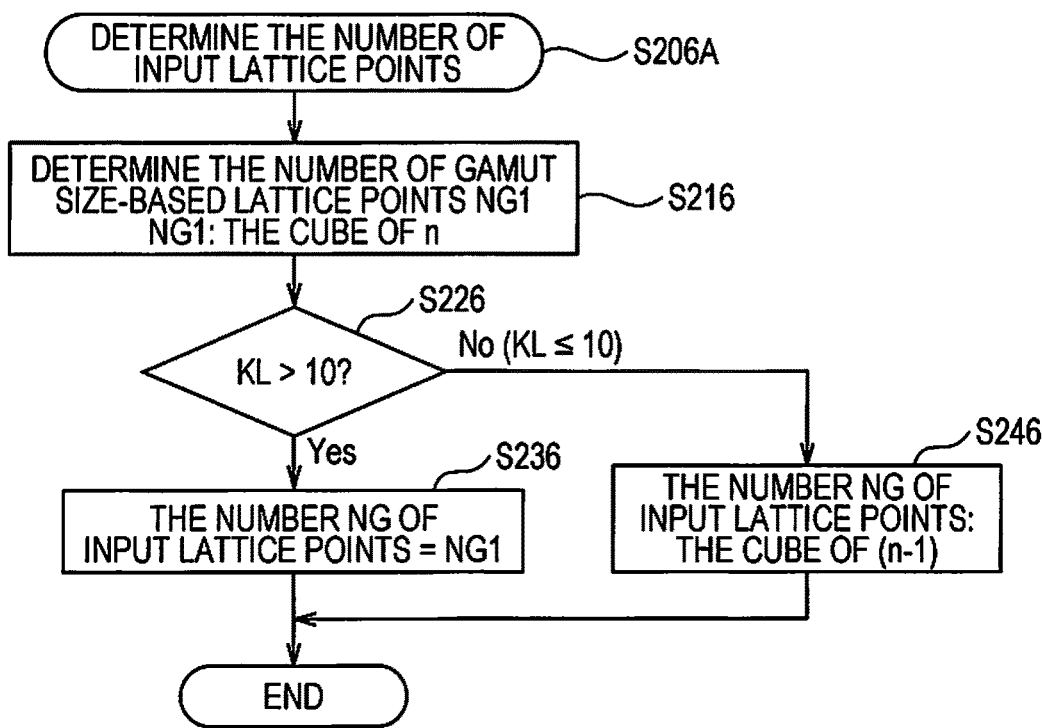
FIG. 9 is a flowchart showing a flow of a step of determining the number of input lattice points of a second embodiment.
FIG. 10 is an explanatory view illustrating an example of grouping based on the type of a print medium and a gamut size.

FIG. 9 is a flowchart showing a flow of a step of determining the number of input lattice points of the present embodiment.

In step S216, the color system conversion table generator 100 determines the number NG1 of gamut size-based lattice points in accordance with the gamut size GS acquired in step S204. Here, similarly to the first embodiment, the number of input lattice points on a basis of the range of the gamut size GS is determined as the number NG1 of gamut size-based lattice points. In the present embodiment, the number NG1 of gamut size-based lattice points=the cube of n (n is a positive integer). Similarly to the first embodiment, n is set to any of 22, 17, or 16 depending on the gamut size.

In step S226, the color system conversion table generator 100 uses the colorimetric value acquired in step S104 (FIG. 3) to calculates a color development effect KL of K ink (black ink) by the following Expression 2.

color development effect $KL$ of $K$ ink=luminosity($L$ value) of Composite $K$−luminosity($L$ value) of Rich $K$ (Expression 2), where
Composite K: C=100%, M=100%, Y=100%, K=0%
Rich K: C=100%, M=100%, Y=100%, K=100%

In Expression 2, a brightness difference between K=0% and K=100% is calculated. The color development effect KL of the K ink in the present embodiment is also referred to as a brightness range of the K ink. Note that the color development effect KL of the K ink may be calculated by the other calculation expressions.

In the color system conversion table generator 100, the number NG of input lattice points=NG1 (step S236) when KL>10, and the number NG of input lattice points=cube of (n−1) (step S246), when KL≤10. In other words, when KL≤10, 1 is subtracted from NG1 per dimension.

As described above, according to the method for generating a color system conversion table of the present embodiment, when the color development effect of the K (black) ink is small, the number of input lattice points of the CMY-Lab table 16 is reduced. A small chromatic effect KL of the K ink (a small brightness range of the K ink) means that the gamut size of a dark area does not increase even when K ink is used (black is expressed by a color mixture of C ink, M ink, Y ink, K ink), as compared to the case where the K ink is not used (black is expressed by only a color mixture of C ink, M ink, and Y ink). The gamut size in the dark area does not increase, which means that with reference to a change in CMY, the change in Lab is small. Thus, even when the number of input lattice points of the CMY-Lab is reduced and the interval of CMY is increased, a reduction in color reproduction accuracy at the time of generating the B2A table 12 is suppressed since the change in the color value (Lab) is small. Thus, a reduction in color reproduction accuracy is suppressed, and additionally, a time required to generate the B2A table 12 can be reduced.

C. Third Embodiment

A method for generating a color system conversion table of a third embodiment determines, in the generation step of the CMY-Lab table 16 of the first embodiment, the number of input lattice points in accordance with the type of print medium (medium type) instead of the gamut size.

FIG. 10 is an explanatory view illustrating an example of grouping based on the types of the print medium and the gamut size.

In the example of FIG. 10, as a print medium (medium type) usable in the printer 200 (FIG. 1), five types of medium, film, adhesive vinyl chloride, tarpaulin, canvas, synthetic paper, cloth are shown. Commonly used names of the medium types are shown. The average gamut size is calculated in detail from a result of the colorimetry, which is obtained by printing a color chart by using each medium (print medium) on the basis of the color chart data 30 (FIG. 1) and by measuring the colorimetric value of the printed material by using the colorimeter 210 (FIG. 1). Note that "average" means an average of a plurality of samples. On the basis of a frequency distribution obtained from the result of the colorimetry of the plurality of samples, the five types of media are classified into three groups in accordance with the gamut size.

In the method for generating a color system conversion table of the present embodiment, the color system conversion table generator 100 acquires a print medium type (medium type) instead of the gamut size acquisition step (step S204) in the method for generating a color system conversion table (FIG. 5) of the first embodiment. For example, when a user causes a display unit (not shown) connected to the color system conversion table generator 100 to display a plurality of medium types and selects a desired medium type via an operation unit (not shown), the color system conversion table generator 100 receives the selection made by the user. In this way, the color system conversion table generator 100 acquires the media type.

In step S206 (FIG. 5), the color system conversion table generator 100 determines the number NG of input lattice points in accordance with the medium type (in other words, in accordance with a group based on the medium type). For example, the number NG of input lattice points is determined such that group 1: the number NG of input lattice points=cube of 22, group 2: the number NG of input lattice points=cube of 17, and group 3: the number NG of input lattice points=cube of 16. Moreover, similarly to the second example, the number of input lattice points may be determined as the number of input lattice points taking the color development effect of the K ink into consideration.

According to the method for generating a color system conversion table of the present embodiment, the medium type and the number of input lattice points of the CMY-Lab table 16 are associated with each other in advance, and therefore, the number of input lattice points appropriate to the medium type selected by the user is determined. The gamut size is dominantly influenced by the medium type and the number of input lattice points corresponding to the medium type is determined in accordance with the gamut size which has been calculated in advance, and therefore, determining the number of input lattice points in accordance with the medium type means determining the number of input lattice points in accordance with the gamut size. In the present embodiment, it is determined such that the number of input lattice points decreases as the gamut size associated with the medium type decreases, and therefore, a reduction in color reproduction accuracy can be suppressed. Moreover, when the color system conversion table is generated, the gamut size is not calculated, and therefore, the process speed is more increased. Note that in the present embodiment, an example in which the number of input lattice points of the CMY-Lab table 16 is determined in accordance with the medium type is described, but the number of input lattice points of the CMY-Lab table 16 may be determined in accordance with a combination of the medium type and the ink type.

D. Fourth Embodiment

A difference of the method for generating a color system conversion table of a fourth embodiment from the method for generating a color system conversion table of the first embodiment is only a step of determining the input lattice point VG3 in a process of generating the CMY-Lab table 16 (FIG. 5). Thus, the step of determining the input lattice point VG3 will be described below.

In the present embodiment, the color system conversion table generator 100 determines the input lattice point VG3 such that a K generation position of the K generation curve KC acquired in step S200 is included in the input lattice point VG3. Here, the K generation position corresponds to a maximum CMY value (%) of CMY values having a K generation amount of 0% in the K generation curve KC. When for example, the K generation curve KC acquired in step S202 is the first K generation curve KC1 shown in FIG. 4, the K generation position is 0% and includes 0% as the C value, the M value, and the Y value of the input lattice point. When the second K generation curve KC2 is acquired, the K generation position is 30% and includes 30% as the C value, the M value, and the Y value of the input lattice point. When the third K generation curve KC3 is acquired, the K generation position is 60% and includes 60% as the C value, the M value, and the Y value of the input lattice point. When the fourth K generation curve KC4 is acquired, the K generation position is 90% and includes 90% as the C value, the M value, and the Y value of the input lattice point.

When the input lattice point of the CMY-Lab table 16 does not include the K generation position of the K generation curve KC (K generation curve KC selected by a user) acquired in step S202, converting the input lattice point (CMY value) of the CMY-Lab table 16 into the CMYK value by using the K generation curve KC in step S210 results in generation of K from a CMY value smaller (or larger) than the K generation position specified by the K generation curve KC. In contrast, in the present embodiment, the input lattice point of the CMY-Lab table 16 is determined such that the input lattice point of the CMY-Lab table 16 includes the K generation position, and therefore, a reduction in color reproduction accuracy is suppressed.

E. Fifth Embodiment

A difference of the method for generating a color system conversion table of a fifth embodiment from the method for generating a color system conversion table of the first embodiment is only the step (step S206) of determining the number NG of input lattice points in the process of generating the CMY-Lab table 16 (FIG. 5). Thus, the step of determining the the number NG of input lattice points will be described.

In the present embodiment, the color system conversion table generator 100 determines the number NG of input lattice points such that the number NG of input lattice points decreases as the K generation position of the K generation curve KC acquired in step S200 becomes late (in other words, K generation position (CMY value) becomes large). For example, in contrast to the number of input lattice points determined on the basis of the gamut size, the number of input lattice points is reduced on the basis of the K generation position of the K generation curve KC. Specifically, the number of input lattice points is provisionally determined in accordance with the gamut size in a manner similar to step S206 of the first embodiment, and it is assumed that the determined number of input lattice points is the cube of N, and in this case, the number of input lattice points is reduced to the cube of (N−1), the cube of (N−2), . . . in accordance with the K generation position. When each K generation curve is denoted by the mKth generation curve KCm (m=1, 2, 3, 4) and the provisionaly determined number of input lattice points is "the cube of N", the number of input lattice points is determined as "the cube of "(N−m+1)". For example, when the gamut size GS acquired in step S204 is expressed as gamut size GS>2,500,000, the provisional number of input lattice points is determined as the cube of 22. When the K generation curve KC acquired in step S202 is the first K generation curve KC1 shown in FIG. 4, it is determined that m=1 and the number NG of input lattice points=the cube of (N−1+1)=the cube of N. Similarly, when the second K generation curve KC2 is acquired, the number NG of input lattice points=the cube of (N−1), when the third K generation curve KC3 is acquired, the number NG of input lattice points=the cube of (N−2), when the fourth K generation curve KC4 is acquired, and the number NG of input lattice points=the cube of (N−3).

In conversion from the CMY value into the CMYK value, when a range in which K is not generated (for example, a range from 0% to 30% of CMY value when the second K generation curve KC2 is selected), the linearity of the CMYK value and the Lab value is high, and therefore, even when the interval between lattice points is set to be large, an interpolation error in step S304 of generation process of the B2A table 12 is less likely to occur. Thus, when the number NG of input lattice points is determined such that the the number NG of input lattice points determined in step S206 decreases as the K generation position of the K generation curve KC selected in step S202 (FIG. 5) increases, a reduction in color reproducibility is suppressed, and additionally, the process speed of the color system conversion table generation process can be increased.

F. Sixth Embodiment

A difference of the method for generating a color system conversion table of a sixth embodiment from the method for generating a color system conversion table of the first embodiment is only the step (step S208) of determining the input lattice point VG3 in the process of generating the CMY-Lab table 16 (FIG. 5). Thus, the step of determining the input lattice point VG3 will be described.

In the present embodiment, the color system conversion table generator 100 determines the input lattice point VG3 such that the number of input lattice points is large in a range where the CMY value is larger than the K generation position of the K generation curve KC acquired in step S200. For example, the number of input lattice points VG3 is determined as described below. To simplify the description, an example in which the number of input values (for example, C values) per dimension is 11 will be described below. When the input values are determined by being equally divided within a range from 0 to 100(%), the input values are 0, 10, 20, 30, 40, 50, 60, 70, 80, 90, and 100(%). When the third K generation curve KC3 is selected in step S202, the number of input lattice points at higher than or equal to the K generation position (60%) is the cube of 5. In the present embodiment, a large number of lattice points greater than or equal to CMY value 60% is set. For example, the input values (for example, C values) are set to 0, 30, 60, 65, 70, 75, 80, 85, 90, 95, and 100. That is, the C values in a range from 0 to 60 are determined at an interval of 30, and the C values in a range from 60 to 100 are determined at an interval of 5. The M values and the Y values are determined in a similar manner. In this way, the number of input lattice points greater than or equal to the K generation position (60%) is the cube of 9. That is, as compared to the case where the input lattice points are arranged (determined) at regular intervals, the number of input lattice points at greater than or equal to the K generation position can be increased without increasing the total number NG of input lattice points. In this way, the interval between lattice points in a range where the nonlinearity of the CMYK value and the Lab value is high becomes narrow, and therefore, interpolation errors in step S304 of generation process of the B2A table 12 generation process can be reduced, thereby increasing the color reproduction accuracy.

In the description of the input lattice point, an example has been described in which the interval between input lattice points from 0 to the K generation position is different from the interval between input lattice points from the K generation position to 100%, but the interval between input lattice points from 0 to the K generation position is constant, and the interval between input lattice points from the K generation position to 100% is constant. However, it is required only that the interval between lattice points in a range where K is generated is narrower than the interval between lattice points in a range where K is not generated, and the interval between lattice points does not have to be regular interval. It is required only that the minimum interval between lattice points in a range where K is generated is narrower than the minimum interval between lattice points in a range where K is not generated. For example, in a range where K is generated (for example, in the case of the third K generation curve KC3, CMY value≥60%), it may be determined that the input lattice point may become particularly narrow in a range 70≤CMY value≤90 in which the nonlinearity is high.

G. Variation (1) In the embodiment, as the gamut size GS, an approximately calculated result by Expression 1 is used, but the other calculation expressions may be used for approximation. Moreover, the gamut size may be calculated accurately by means of the colorimetric value acquired in step S104 (FIG. 3). Note that since a processing time is required for calculation of the accurate gamut size, the gamut size GS is preferably obtained by an approximation method (approximate calculation expression) by which a good correlation with the accurate gamut size can be obtained.

(2) In the embodiment, the acquisition step (step S202) of the K generation curve KC and the acquisition step (step S204) of the gamut size are performed in the CMY-Lab table generation process (step S200) but may be performed before the CMY-Lab table generation process (step S200) is started. For example, the acquisition step of the K generation curve KC may be performed before the process of generating the A2B table (step S100) or may be performed in the process of generating the A2B table (step S100). Moreover, the acquisition step of the gamut size may be performed between the process of generating the A2B table (step S100) and process of generating the CMY-Lab table (step S200) or may be performed in the process of generating the A2B table (step S100).

(3) The color system conversion table generation system may adopt a configuration in which the printer is not included in the colorimeter but a single colorimeter is used.

(4) In the embodiment, a program, a method, an apparatus configured to generate a color system conversion table have been described, but the present invention is applicable to a printer production system including an incorporation unit configured to incorporate the color system conversion table obtained as described above into the printer. The color system conversion table generator 100 configured to generate the color system conversion table may be included in the printer production system or may be included in other systems or apparatuses. Note that the incorporation unit of the production system can be realized, for example, as an installer (installing program) of the printer driver.

(5) A program, a method, and an apparatus configured to generate the color system conversion table have been described, but the present invention can be realized by a printer which includes the above-described color system conversion table generator and which is configured to convert input print data based on the color system conversion table generated by the color system conversion table generator to perform printing.

(6) In the embodiment, an example in which the method for generating a color system conversion table of the embodiment is realized by using the color system conversion table generation system 300 has been described but the present invention is not limited to this example. For example, a creator of the color system conversion table inputs color chart data to a printer including a color conversion table 42 from other computer than the color system conversion table generator 100 to print a color chart, the colorimetric value is obtained by the colorimeter, and the creator of the color system conversion table may input the result (colorimetric value) of the colorimetry to the color system conversion table generator 100.

(7) In the embodiment, some or all of the functions and processes realized by software may be realized by hardware. Some or all of the functions and processes realized by hardware may be realized by software. As the hardware, various types of circuits such as an integrated circuit, a discrete circuit, or a circuit module obtained by combining an integrated circuit and a discrete circuit may be used.

The technique disclosed in the present specification is not limited to the embodiments or the variations in the present specification but may be realized in various configurations without departing from scope of the technique. For example, technical features in the embodiments and the variations corresponding to technical features in each embodiment described in the summary of the invention may be changed or combined with each other accordingly in order to solve some or all of the above-described problems, or in order to achieve some or all of the above-described problems. When the technical feature is not described as essential in the present specification, the technical features may be accordingly deleted.

This application claims priority under 35 U.S.C. § 119 to Japanese Patent Application No. 2016-232621, filed Nov. 30, 2016. The entire disclosure of Japanese Patent Application No. 2016-232621 is hereby incorporated herein by reference.

What is claimed is:

1. A method for generating a color system conversion table for generating a first color system conversion table in which a color specification value of a device independent color space is an input and a color specification value of a CMYK color system including three primary colors of pigment and a black color is an output, the method comprising:

generating, by a processor, a second color system conversion table in which the color specification value of the CMYK color system is an input and the color specification value of the device independent color space is an output, a colorimetric value of a color chart generated by a printer by using a color chart value of the CMYK color system stored in a memory being measured to acquire a colorimetric value of the device independent color space corresponding to the color chart value, the color chart value and the colorimetric value being used to perform interpolation to obtain the color specification value of the device independent color space as an output value, the color specification value of the device independent color space corresponding to a predetermined input value of the second color system conversion table;

generating, by the processor, a third color system conversion table in which a color specification value of a CMY color system including three primary colors of the pigment is an input and the color specification value of the device independent color space is an output;

acquiring, by the processor, a conversion characteristic for converting the color specification value of the CMY color system into the color specification value of the CMYK color system from the memory;

obtaining. by the processor, an input CMY value of the CMY color system corresponding to a predetermined input value of the first color system conversion table by using the third color system conversion table; and determining, by the processor, a first output value as an output value of the first color system conversion table, the output value being obtained by converting the input CMY value into the color specification value of the CMYK color system by using the conversion characteristic, wherein the generating of the third color system conversion table includes:
  determining the number of input lattice points of the third color system conversion table such that the number of input lattice points of the third color system conversion table decreases as a gamut size of the printer decreases;
  determining an input lattice point of the third color system conversion table;
  obtaining an input CMYK value of the CMYK color system corresponding to the input lattice point of the third color system conversion table by using the conversion characteristic; and
  determining a third output value as an output value of the third color system conversion table by obtaining the color specification value of the device independent color space corresponding to the input CMYK value by using the second color system conversion table.

2. The method according to claim 1, wherein
in the determining of the number of input lattice points in the generating of the third color system conversion table, the number of input lattice points of the third color system conversion table is reduced as a brightness range of black ink decreases.

3. The method according to claim 1, wherein
in the determining of the input lattice point of the generating of the third color system conversion table, the input lattice point of the third color system conversion table includes a black color generation point of the conversion characteristic.

4. The method according to claim 1, wherein
in the determining of the number of input lattice points of the generating of the third color system conversion table, the number of input lattice points of the third color system conversion table is reduced as a coordinate value corresponding to the black color generation point of the acquired conversion characteristic increases.

5. The method according to claim 1, wherein
in the determining of the input lattice points of the generating of the third color system conversion table, an interval between input lattice points whose one-dimensional coordinate value is larger than the black point generated point of the conversion characteristic which has been acquired is smaller than an interval between input lattice points in an area in which the one-dimensional coordinate value is smaller than that of the black point generated point.

6. A non-transitory computer readable medium having a program which causes a computer to generate a first color system conversion table in which a color specification value of a device independent color space is an input and a color specification value of a CMYK color system including three primary colors of pigment and a black color is an output, and causes the computer to execute a process, the process comprising:

generating a second color system conversion table in which the color specification value of the CMYK color system is an input and the color specification value of the device independent color space is an output, a colorimetric value of a color chart generated by a printer by using a color chart value of the CMYK color system stored in a memory being measured to acquire a colorimetric value of the device independent color space corresponding to the color chart value, the color chart value and the colorimetric value being used to perform interpolation to obtain the color specification value of the device independent color space as an output value, the color specification value of the device independent color space corresponding to a predetermined input value of the second color system conversion table;

generating a third color system conversion table in which a color specification value of a CMY color system including three primary colors of the pigment is an input and the color specification value of the device independent color space is an output;

acquiring, from the memory, a conversion characteristic for converting the color specification value of the CMY color system into the color specification value of the CMYK color system;

obtaining an input CMY value of the CMY color system corresponding to a predetermined input value of the first color system conversion table by using the third color system conversion table; and determining a first output value as an output value of the first color system conversion table, the output value being obtained by converting the input CMY value into the color specification value of the CMYK color system by using the conversion characteristic, wherein the generating of the third color system conversion table includes:
  determining the number of input lattice points of the third color system conversion table such that the number of input lattice points of the third color system conversion table decreases as a gamut size of the printer decreases;
  determining an input lattice point of the third color system conversion table;
  obtaining an input CMYK value of the CMYK color system corresponding to the input lattice point of the third color system conversion table by using the conversion characteristic; and determining a third output value as an output value of the third color system conversion table by obtaining the color specification value of the device independent color space corresponding to the input CMYK value by using the second color system conversion table.

\* \* \* \* \*